United States Patent Office 3,175,964
Patented Mar. 30, 1965

3,175,964
SURFACE TREATMENT OF METAL ARTICLE BY
WATER-SOLUBLE (FILM-FORMING) MATERIAL
Seiichi Watanabe and Saburo Ayusawa, Tokyo, Tadashi
Tanaka, Todamachi, and Kiyoshi Komata, Musashino,
Tokyo, Japan, assignors to Yawata Iron and Steel Co.,
Ltd., Tokyo, Japan
No Drawing. Filed Jan. 17, 1961, Ser. No. 83,149
Claims priority, application Japan, Jan. 23, 1960,
35/2,182
15 Claims. (Cl. 204—37)

The present invention relates to the surface treatment of a metal article, and more particularly, has for its object the improvement of the corrosion resistance and paint adherence properties of a ferrous metal object, such as, steel sheet.

Heretofore, a number of surface treating processes have been proposed in order to solve a problem in connection with the corrosion resistance or adherence of finish coatings of the metal surface. For example, it is known that the phosphating treatment involving the use of a phosphate solution, such as, iron, zinc, manganese or calcium phosphate, or an electrolytic treatment in a phosphate or chromate solution with an alternating or direct electric current, which has somewhat to do with this invention. Although the above processes have attained corrosion resistance, adaptability for fabrication and adherence, the desired properties, to a certain degree, however, it is hardly possible at the present state of technology to obtain an all-purpose treatment process by which the treated article would satisfy these properties. For instance, a somewhat thick film resulting from the surface treatment is required in order to expect an effect of corrosion resistance while, on the contrary, an insufficient workability will result therefrom. Further, when we take the adherence of finish coatings to the treated substrate into consideration, the problem in view will become all the more difficult.

This invention contemplates the solution of the above problem, and more particularly, the provision of a surface treatment process by which a satisfactory corrosion resistance, an improved adherence and a good adaptability for fabrication are imparted to the treated surface of a metal article, particularly, of a ferrous metal article, said treatment comprises forming a film on the metal surface by an almost one step process for a very short period of time wherein the ferrous metal substrate is first treated with an inorganic compound, and then an organic highly polymerized film is formed by the combined action of the inorganic compound resulting from the first treatment and an organic compound.

The aqueous solution employed for carrying out the invention consists of three constituents, the first constituent is a water-soluble organic high polymer on the acid side, the second one is a water-soluble inorganic compound, preferably, a water-soluble chromium compound which is believed to be such a compound as accelerates an oxidation, reduction, chelate formation, polymerization or condensation reaction with the above organic high polymer, the third one of various acids usually employed for treating the ferrous metal substrate and also required for keeping the treating solution acidic, and their acidic derivatives. Thus, this invention is characterized in that the metal article to be treated is subjected to a direct current electrolysis as a cathode, then withdrawn therefrom, dried, and a film is produced thereon. However, it is possible to treat it in the solution containing the first and second constituents only in a very limited case.

The above water-soluble organic high polymers on the acid side are as follows:

(1) Polyhydroxylic high polymers.
   Partially hydrolyzed polyvinyl acetates.
   Polyvinyl alcohol-maleic acid copolymers.
   Polyethylene oxides.
   Polymethylol ureas or melamines and their derivatives.
   Polymethylol phenols.
(2) Polycarboxyl polymers.
   Polyalkylvinylether-maleic acid copolymers and their derivatives.
   Polymaleic acid-ethylene copolymers and their derivatives.
   Polymaleic acid-vinyl acetate copolymers and their derivatives.
   Polyacrylic acids or methacrylic acids and their copolymers and their derivatives.
(3) Water-soluble polysulphonic acids of organic high polymers.
(4) Other water-soluble natural high polymers and their derivatives, including, for example, partially lower alcohol etherified celluloses.

Water-soluble inorganic compounds of various kinds are as follows:

(1) Chromium compounds of trivalent or hexavalent chromium.
(2) Various inorganic compounds considered as having an oxidizing action on the above water-soluble organic high polymers on the acid side. Oxidizing inorganic acids, such as, nitric acid. Various inorganic salts, such as, permanganates, perborates, persulphates, regarded usually as an oxidizer.
   Peroxides of metals which are partially water-soluble.
(3) Water-soluble inorganic compounds, such as, phosphates, borates, copper sulphate, ferric chloride, silver nitrate, zirconium nitrate, titanyl sulphate, etc., usually regarded as a reactant for bridged bonding, chelate formation, polymerization, condensation or gelation with the above-mentioned water-soluble organic high polymers.

An acid necessary to maintain the treating solution acidic includes mineral acids or their acidic derivatives, such as nitric acid, sulphuric acid or organic acids or their acid derivatives, such as, acetic acid, citric acid. Further, various acids usually employed for surface treating metal substrates, include inorganic acids, such as, boric acid, phosphoric acid and their acidic derivatives, and organic acids, such as, oxalic acid and its acidic derivatives.

In accordance with the present invention, for instance, a cleaned ferrous metal article as a cathode is subjected to a direct current electrolysis at room temperature in an aqueous solution consisting of three components, that is, partially hydrolyzed polyvinyl acetate as a water-soluble organic high polymer, sodium bichromate as a water-soluble inorganic compound and phosphoric acid which serves as a substrate treating agent as well as an acidity holding agent, then it is withdrawn therefrom, and finally dried by heating. The results of the salt water spray test specified by the Japanese Industrial Standard (J.I.S.) conducted on a sample of the above treated ferrous metal article show that it has taken a period of from 50 to 100 hours before a red rust develops on it, which must be a note-worthy fact. In the same salt water spray test, a non-treated ferrous metal article of the same composition has developed a rust thereon within a short period of several minutes while, on the other hand, another article of the same composition coated with the above aqueous solution by dipping only has produced a rust change within a period of 4 to 5 hours. Although we inventors have made considerable efforts on the theoretical elucidation of this wonderful and epoch-making surface treatment of our invention, we find it very difficult to obtain a complete understanding. However, according to the investigation, results of the film of above treated steel sheet by the aid of electron diffraction, X-ray diffraction, infrared or ultraviolet spectrometry etc., its reaction mechanism is considered as follows: When we consider the reaction a steel sheet undergoes in which it is subjected to electrolysis as a cathode in an aqueous solution consisting of, for example, a partially hydrolyzed polyvinyl acetate, chromic acid and phosphoric acid, and then dried by heating, it is believed that a metallic oxide film present on the steel surface is reduced by the cathodic electrolysis thereof so that a microcrystalline phase consisting principally of phosphates firmly adhered to its surface directly and a non-crystalline phase containing or adsorbing chromic chromate, phosphate or chromate in the form of gel are formed thereon resulting from cathodic reduction. Furthermore, when we take the above oxidation and reduction reaction in the presence of polyvinyl acetate into consideration, it seems that a much more complicated reaction has occurred so that a stronger bond between respective films has been brought about. Thus, it is believed that a simultaneous complicated chemical reaction involving an oxidation and reduction reaction between polyvinyl acetate and the above inorganic films, chelate formation, combination of principal constituents in the aqueous solution, polymerization of polyvinyl acetate, oxidation, etherification and esterification, etc., has taken place to produce a strong adherent thermosetting film on the steel surface. Accordingly, in view of the structure of the film thus produced on the metal surface consisting of metal, inorganic and organic compounds, an improved workability as well as corrosion resistance together with an improved adherence for a finish coating composition consisting of almost an organic compound would be relied on. In addition, a significant advantage should be emphasized on a single treating step of this invention which can be carried out in a rapid and economical manner compared with the conventional several steps of prior art in order to form a film of metal-inorganic-organic compounds on the metal surface. Besides, it is understood that not only the three-constituent system of the above-mentioned polyvinyl acetate-chromic acid-phosphoric acid, but also the multi-constituent system of organic high polymers having a functional group and inorganic compounds which cause the above reaction can be considered likewise in the same reaction as above.

The film obtained from the electrolytic treatment in the electrolyte of the invention per se is resistant to the outdoor exposure, strongly resistant to corrosion, firmly adherent to various finish coatings, and has an excellent adaptability for fabrication. The properties of the film which has endured the salt water spray test for a considerable period of time will show almost the same result as the one which has not been conducted by the test.

The composition of the electrolyte and a treating process for carrying out the invention will be described in details: it consists of the three principal constituents, that is, an organic high polymer, an inorganic salt and an acid in an aqueous colored or colorless transparent solution of a viscosity 1–1000 cp. The first principal constituent, organic high polymer should be water-soluble on the acid side, therefore any polymer in its category is limited as described hereinbefore. Further, in view of the physical and chemical behavior of the organic high polymer with the inorganic salt and on the acid side, and also, in view of different properties of respective high polymer, different conditions of application of each compound should be recognized in carrying out the treatment. In reference to polyhydroxylic high polymers, for example, partially hydrolyzed polyvinyl acetate in the reaction of the treatment of this invention, the chemical reactions, such as, polymerization of high polymers involving cross-linking including etherification, ethylene linkage and chelate formation, take place to produce a uniform and firmly adherent film on the metal surface. On the other hand, however, in reference to high polymers of polycarboxylic and polysulphonic acids, the chemical reaction involves further esterification and other reactions with the result that the film thus produced contains a considerable amount of free carboxylic or sulphonic groups which is occasionally deleterious to it. However, when the electrolyte is added with such an auxiliary constituent as reacts with the above worrying free acid groups in the treating conditions of the invention, for example, water-soluble polyhydroxylic compounds and polyamines, the film thus produced becomes physically and chemically stable and develops an excellent property.

An organic compound which can be employed with a water-soluble polycarboxylic polymer or an organic high polymer polysulphonic acid as an auxiliary constituent on the acid side includes as follows:

(1) Polyalcohols,
    Glycerin, sorbitol etc.
    Glycols, polyhydroxylic high polymers and natural high polymers included in the appended claims.
(2) Polyamines.

Further, the same holds true in connection with polyhydroxylic polymer, and other compounds which combine with an alcohol radical are also desirable. Water-soluble polyhydroxylic compounds, polycarboxylic compounds etc. mentioned below are employed. However, in this case, the application of the above auxiliary constituents is not always necessary, but, if applied, it is possible to obtain a better film on the metal surface (see the examples).

(1) Polyhydroxylic polymers.
    Polymethylol ureas or melamines and its derivatives.
(2) Polycarboxylic high polymers mentioned above.

The above-mentioned organic high polymers or their reactants, organic auxiliary compounds are respectively employed in the range of 1 to 25% in the treating solution, and a suitable solution is formed in accordance with different inherent viscosities of respective compound employed.

The concentration of the water-soluble inorganic compounds, the second principal constituent of the treating solution, is usually in the range of 0.01 to 20%. For example, in the case of chromic acid or sodium bichromate, the corrosion resistance tends to increase logarithmically in proportion to the amount of a compound used. Further more, as described hereinbefore, the addition of an inorganic compound considered as having an oxidizing action towards the water-soluble organic high polymer, the first principal constituent, on the acid side, or of another inorganic compound considered as a reactant for cross-linkage, chelate formation, polymerization, condensation and gelation therewith will develop a better film on the metal surface. The concentration of an acid or its derivative, the third principal constituent, is in the range of 0.1 to 20%, and its actual pH is in the range of 0.5 to 7.0. However, the value of optimum pH will be determined depending on the kind of the third principal constituent, such as phosphoric acid, sulfuric acid or its acid salts and also on the relation to the other principal compounds. Further, as described hereinbefore, if it is considered that the second constituent involves the function of the third constituent, the treating solution may consist of the first and second constituents only.

A feature of the surface treatment of ferrous metal in accordance with the invention is to subject the ferrous metal article to the direct current electrolysis in the aqueous solution of the composition specified above. In reference to the electrolytic treatment of steel sheet as a cathode, it may be described that the corrosion resistance or workability of the treated metal varies approximately parabolically as the current density, and approximately logarithmically as the electrolytic treating time. However, the above tendency depends on different compositions of the treating aqueous solution, and the current density and the electrolytic time should be adjusted by the desired property of the film produced, the gas evolution at the electrode, and the economic reason. In accordance with the treatment of the invention, it is preferred that the current density is in the range of 0.5 to 10 amp./dm.², and the treating time is 0.2 second or more, which depends on the current density.

If the ferrous metal article to be treated is subjected to electrolysis as an anode in the aqueous solution of the above composition, a long chain molecule having an anion character will concentrate in the neighborhood of the surface of metal electrode. Thereafter, when it is subjected to electrolysis as a cathode, a comparatively better result will follow. Further, if the ferrous metal article to be treated is made alternately an anode or cathode by various ways in the above aqueous solution, for example, if a rectangular wave alternating current is employed, an interesting result will follow. In some cases a number of bubbles take place in the solution and on the surface thereof resulting from the evolution of hydrogen or oxygen gas at the electrode of the metal in accordance with the composition and viscosity of the treating solution. In this case, the addition of a very small amount of surface-active agent to the treating aqueous solution will overcome the above problem without interfering with the treating effect.

The cause and mechanism of the excellent effect obtained from the surface treatment of this invention has been described in detail hereinabove, and the improved film is brought about by not only the physico-chemical firm bond between the metal surface, inorganic salt and organic polymers, but also by the electrochemical bond. Accordingly, the similar mechanism may be applied to metals other than a ferrous one, for example, Sn, Zn, Al and Mg or their plated surfaces. Therefore, the surface treatment of this invention will improve the corrosion resistance of tinplate and galvanized steel sheet.

The treating solution of the invention is furnished as an aqueous solution containing the three principal constituents and auxiliary ones mentioned hereinbefore, and the ferrous metal article is dipped into the solution and electrolyzed under the specified condition. It is immediately withdrawn from the bath after the treatment, then dried in an electric furnace, an infrared drying oven, or a hot air furnace at a temperature of 100° to 300° C. for a period of several minutes to thirty minutes to produce a completely formed film on the metal surface.

The examples in accordance with the present invention are described hereinbelow:

*Example 1*

An aqueous solution: G./l.
  Partially hydrolyzed polyvinyl acetate_____ 50
  Phosphoric acid _____ 10
  Chromic acid _____ 30

A thoroughly cleaned steel sheet is electrolyzed as a cathode in the treating solution of the temperature of 20° C. with a current density of 4 amp./dm.² for a period of one second, then withdrawn therefrom, and finally dried at the temperature of 150° C. for a period of five minutes.

*Example 2*

An aqueous solution: G./l.
  Partially hydrolyzed polyvinyl acetate_____ 40
  Chromic acid _____ 50

Cleaned steel sheet is electrolyzed as a cathode in the treating solution of the temperature of 30° C. with a current density of 5 amp./dm.² for a period of two seconds, then withdrawn therefrom, and finally dried at the temperature of 300° C. for a period of ten seconds.

*Exmple 3*

An aqueous solution: G./l.
  Partially hydrolyzed polyvinyl acetate _____ 60
  Sodium bichromate _____ 120
  Boric acid _____ 0.5
  Phosphoric acid _____ 10

A cleaned steel sheet is electrolyzed as a cathode in the treating solution of the temperature of 30° C. with a current density of 4 amp./dm.² for a period of one second, removed therefrom, and finally dried at the temperature of 150° C. for a period of five minutes.

*Example 4*

An aqueous solution: G./l.
  Partially hydrolyzed polyvinyl acetate_____ 50
  Phosphoric acid _____ 10
  Chromic acid _____ 30
  Non-ionic surface-active agent _____ 1

A cleaned steel sheet is electrolyzed as an anode in the treating solution of the temperature of 20° C. with a current density of 2 amp./dm.² for a period of one second, then electrolyzed as a cathode in the same solution with a current density of 4 amp./dm.² for a period of one second, then removed therefrom, and finally dried at the temperature of 180° C. for a period of three minutes.

*Example 5*

An aqueous solution: Parts
  Polyethylene-maleic acid copolymer, 3% _____ 400
  Partially hydrolyzed polyvinyl acetate, 5%____ 200
  Phosphoric acid, 85% _____ 8
  Sodium bichromate _____ 15
  Potassium permanganate _____ 2

A cleaned steel sheet is electrolyzed as a cathode in the treating solution of the temperature of 30° C. with a current density of 2.8 amp./dm.² for a period of five seconds, removed therefrom, and finally dried at the temperature of 180° C. for a period of twenty seconds.

*Example 6*

An aqueous solution: Parts
  Polyethylene oxide, 5% _____ 100
  Polyvinyl methylether-maleic acid copolymer, 5% _____ 25
  Phosphoric acid, 85% _____ 1
  Chromic acid _____ 2

A cleaned steel sheet is electrolyzed as a cathode in the treating solution of the temperature of 25° C. with a current density of 3 amp./dm.² for a period of two seconds, removed therefrom, and dried at the temperature of 200° C. for a period of twenty seconds.

*Example 7*

An aqueous solution: G./l.
  Partially hydrolyzed polyvinyl acetate_____ 50
  Chromic acid _____ 5
  Phosphoric acid _____ 10

A cleaned steel sheet is electrolyzed as a cathode in the treating solution of the temperature of 40° C. with a current density of 4 amp./dm.² for a period of 30 seconds, removed therefrom, and dried at the temperature of 150° C. for a period of ten minutes.

*Example 8*

An aqueous solution:
  Polyvinyl methlether-maleic acid copolymer, 6% _____parts by weight___ 500
  Partially hydrolyzed polyvinyl acetate, 5% _____parts___ 100
  Phosphoric acid, 85% _____do____ 4
  Chromic acid _____do____ 6

Cleaned steel sheet is electrolyzed as a cathode in the treating solution of the temperature of 30° C. with a direct current of 2.5 amp./dm.² for a period of 5 seconds, removed therefrom, and dried at the temperature of 150° C. for a period of 30 seconds.

*Example 9*

An aqueous solution: G./l.
  Partially hydrolyzed polyvinyl acetate _____ 50
  Chromic acid _____ 30
  Potassium permanganate _____ 5

A cleaned steel sheet is electrolyzed as a cathode in the treating solution of the temperature of 20° C. with a current density of 3.5 amp./dm.$^2$ for a period of 3 seconds, removed therefrom, and dried at the temperature of 150° C. for a period of 5 minutes.

*Example 10*

An aqueous solution:
Polyethylene-maleic
  acid copolymer, 3% _____parts by weight__ 100
Polymethylol urea methyl-ether, 50%__parts__ 50
Chromic acid _____do____ 20

A cleaned steel sheet is electrolyzed as a cathode in the treating solution of the temperature of 15° C. with a current density of 1.5 amp./dm.$^2$ for a period of 10 seconds, removed therefrom, and dried at the temperature of 180° C. for a period of 3 minutes.

*Example 11*

An aqueous solution:
Polyvinyl acetate-maleic
  acid copolymer, 10% _____parts by weight__ 150
Polymethylol melamine
  methylether, 50% _____parts__ 20
Boric acid _____do____ 1
Chromic acid _____do____ 3

A cleaned steel sheet is electrolyzed as a cathode in the treating solution of the temperature of 20° C. with a current density of 3.5 amp./dm.$^2$ for a period of 2 seconds, removed therefrom, and dried at the temperature of 160° C. for a period of 2 seconds, removed therefrom, and dried at the temperature of 160° C. for a period of 5 minutes.

*Example 12*

An aqueous solution: G./l.
Partially hydrolyzed polyvinyl acetate _____ 50
Phosphoric acid _____ 1
Ammonium bichromate _____ 50

A cleaned steel sheet is electrolyzed as a cathode in the treating solution of the temperature of 20° C. with a current density of 4.2 amp./dm.$^2$ for a period of 2 seconds, removed therefrom, and dried at the temperature of 160° C. for a period of 4 minutes.

The results of comparison test conducted on the treated steel sheet, non-electrolytically treated sheet and non-treated sheet in connection with salt water spray test, bending test of coating specified by the Japanese Industrial Standard (J.I.S. K–5560), and cross-cutting test for the adhesion of coating specified by Japan Paint Industry Association are as follows:

| Example No. | Salt Water Spray Test [1] | Bending Test [2] | Cross-Cutting Test [3] |
|---|---|---|---|
| 1 | <50 hrs | | 100/100 |
| 2 | <80 hrs | | 100/100 |
| 3 | <100 hrs | No change | |
| 4 | <50 hrs | do | |
| 5 | | do | 100/100 |
| 6 | | do | 100/100 |
| 7 | | do | 100/100 |
| 8 | | do | 100/100 |
| 9 | <50 hrs | do | |
| 10 | | do | 100/100 |
| 11 | | do | 100/100 |
| 12 | | do | 100/100 |
| Non-treated | 5-10 min | | |
| Non-electrolytic treated | 2-10 hrs | No change | 95/100 |

[1] Based on Japanese Industrial Standard (J.I.S.) Z-2371. Each shows the period of time up to the occurrence of a red rust.
[2] J.I.S. K-5560, Synthetic resin enamel test.
[3] Test specified in "Organic Coating Test Method" by Japan Paint Industry Association.

Next, the results of adhesion test based on the cross-cutting method of finish coatings on the treated steel sheet obtained from the foregoing examples are as follows:

| Finish Coating | Melamine-Alkyd Enamel, white [1] | Lacquer Enamel, white [2] | Oil Paint, white [3] |
|---|---|---|---|
| Experiment No.: | | | |
| 1 | 100/100 | 100/100 | 100/100 |
| 2 | 100/100 | 100/100 | 100/100 |
| 3 | 100/100 | 95/100 | 100/100 |
| 4 | 100/100 | 98/100 | 100/100 |
| 7 | 100/100 | 98/100 | 100/100 |
| 9 | 100/100 | 100/100 | 100/100 |
| Non-treated | 70/100 | 60/100 | 85/100 |
| Non-electrolytic treated | 100/100 | 95/100 | 100/100 |

[1] Commercial enamel. Baking condition: 120° C., 20 min.
[2] Commercial enamel. Drying at room temperature for a period of 48 hours before test.
[3] Commercial oil paint, zinc white A class. Drying for a period of 72 hours before test.

*Example 13*

An aqueous solution:
Polyvinyl methylether-maleic acid copolymer,
  5% _____parts by weight__ 100
Aluminum bichromate _____parts__ 2
Acid zinc phosphate _____do____ 1
Water _____do____ 500

An electrolytically cleaned galvanized steel sheet is electrolyzed as a cathode in the treating solution of the temperature of 80° C. with a current density of 0.5 amp./dm.$^2$ for a period of 0.2 second, then removed therefrom, and dried by the hot air of the temperature of 300° C. for a period of 10 seconds.

The galvanized steel sheet thus treated shows the resistance to corrosion of white rust for a period of 200 hours in the salt water spray test mentioned hereinbefore, and also shows that the treated surface thereof is not deteriorated by either working or friction and has an enhanced paint adherence.

*Example 14*

An aqueous solution: Parts
Polyacrylic acid, 10% _____ 100
Chromic acid _____ 5
Ammonium phosphate _____ 1

Either steel sheet or galvanized steel sheet treated with the conventional phosphate surface treating solution is electrolyzed as a cathode with a current density of 1 amp./dm.$^2$ for a period of 0.5 second. This treatment has improved corrosion resistance, workability and other properties.

*Example 15*

An aqueous solution: G./l.
Polyethylene-maleic acid copolymer _____ 300
Chromium bichromate _____ 200
Phosphoric acid _____ 10

A degreased and cleaned steel sheet is electrolyzed as a cathode in the treating solution of the temperature of 55° C. with a current density of 15 amp./dm.$^2$ for a period of 0.5 second, withdrawn therefrom, an excess of the solution coated thereto is squeezed off by a pair of synthetic rubber rolls, and finally dried in an infrared heating oven at the temperature of 150° C. for a period of 10 minutes.

Furthermore, the treating solution in the above example may be prepared as follows: an aqueous solution consisting of 50% polyethylene-maleic acid copolymer is prepared, then one-third by weight of iron oxide pigment is added as a color pigment and thoroughly mixed, and thereafter chromium bichromate and phosphoric acid are added to produce a colored treating solution.

This colored treating solution is a viscous high thixotropic aqueous one. A cleaned steel sheet or galvanized iron sheet is electrolyzed as a cathode in the above solution with a current density of 2 amp./dm.$^2$ for a period of one second, then an excess of the solution is squeezed off by the rolls, and dried at the temperature of 300° C. for a period of 45 seconds. A quantity of colored film coated to the metal surface amounts to about 90 mg./dm.$^2$, and this colored film gives a weather resistant film with a beautiful semi-glossy appearance.

We claim:

1. A surface treating method for a metal article to produce a film thereon by applying thereto a water-soluble film-forming material which comprises providing an aqueous solution consisting of partially hydrolyzed polyvinyl acetate 50 g./l., phosphoric acid 10 g./l., and chromic acid 30 g./l.; introducing
a cleaned steel sheet into said solution and subjecting the same therein as a cathode to electrolysis at a temperature of 20° C. with a current density of 4 amp./dm.$^2$ for a period of one second, then withdrawing said sheet from said solution, and finally drying said sheet at the temperature of 150° C. for a period of five minutes.

2. A surface treating method for a metal article to produce a film thereon by applying thereto a water-soluble film-forming material which comprises providing an aqueous solution consisting of partially hydrolyzed polyvinyl acetate 40 g./l. and chromic acid 50 g./l.; introducing
a cleaned steel sheet into said solution and subjecting the same therein as a cathode to electrolysis at a temperature of 30° C. with a current density of 5 amp./dm.$^2$ for a period of two seconds, then withdrawing said sheet from said solution, and finally drying said sheet at the temperature of 300° C. for a period of ten seconds.

3. A surface treating method for a metal article to produce a film thereon by applying thereto a water-soluble film-forming material which comprises providing an aqueous solution consisting of partially hydrolyzed polyvinyl acetate 60 g./l., sodium bichromate 120 g./l., boric acid 0.5 g./l. and phosphoric acid 10 g./l.; introducing
a cleaned steel sheet into said solution and subjecting the same therein as a cathode to electrolysis at a temperature of 30° C. with a current density of 4 amp./dm.$^2$ for a period of one second, removing said sheet from said solution, and finally drying said sheet at the temperature of 150° C. for a period of five minutes.

4. A surface treating method for a metal article to produce a film thereon by applying thereto a water soluble film-forming material which comprises providing an aqueous solution consisting of partially hydrolyzed polyvinyl acetate 50 g./l., phosphoric acid 10 g./l., chromic acid 30 g./l. and non-ionic surface-active agent 1 g./l.; introducing
a cleaned steel sheet into said solution and subjecting the same therein as an anode to electrolysis at a temperature of 20° C. with a current density of 2 amp./dm.$^2$ for a period of one second, then electrolyzing said sheet as a cathode in the same solution with a current density of 4 amp./dm.$^2$ for a period of one second, then removing said sheet from said solution, and finally drying said sheet at the temperature of 180° C. for a period of three minutes.

5. A surface treating method for a metal article to produce a film thereon by applying thereto a water-soluble film-forming material which comprises providing a aqueous solution consisting of partially hydrolyzed polyvinyl acetate 50 g./l., chromic acid 5 g./l. and phosphoric acid 10 g./l.; introducing
a cleaned steel sheet into the solution and subjecting the same therein as a cathode to electrolysis at a temperature of 40° C. with a current density of 4 amp./dm.$^2$ for a period of 30 seconds, removing said sheet from said solution, and drying said sheets at the temperature of 150° C. for a period of ten minutes.

6. A surface treating method for a metal article to produce a film thereon by applying thereto a water-soluble film-forming material which comprises providing an aqueous solution consisting of partially hydrolyzed polyvinyl acetate 50 g./l., chromic acid, 30 g./l. and potassium permanganate 5 g./l.; introducing
a cleaned steel sheet into said solution and subjecting the same therein as a cathode to electrolysis at a temperature of 20° C. with a current density of 3.5 amp./dm.$^2$ for a period of 3 seconds, removing said sheet from said solution, and drying said sheet at the temperature of 150° C. for a period of 5 minutes.

7. A surface treating method for a metal article to produce a film thereon by applying thereto a water-soluble film-forming material which comprises providing an aqueous solution consisting of partially hydrolyzed polyvinyl acetate 50 g./l., phosphoric acid 1 g./l., and ammonium bichromate 50 g./l.; introducing
a cleaned steel sheet into said solution and subjecting the same therein as a cathode to electrolysis at a temperature of 20° C. with a current density of 4.2 amp./dm.$^2$ for a period of 2 seconds, removing said sheet from said solution, and drying said sheet at the temperature of 160° C. for a period of 4 minutes.

8. A surface treating method for a metal article to produce a film thereon by applying thereto a water-soluble film-forming material which comprises providing an aqueous solution consisting of polyethylene-maleic acid copolymer 300 g./l., chromium bichromate 200 g./l., and phosphoric acid 10 g./l.; introducing
a degreased and cleaned steel sheet into said solution and subjecting the same therein as a cathode to electrolysis at a temperature of 55° C. with a current density of 15 amp./dm.$^2$ for a period of 0.5 second, withdrawing said sheet from said solution, squeezing off an excess of the solution from said sheet, and finally drying said sheet in an infrared heating oven at the temperature of 150° C. for a period of 10 minutes.

9. Method for treating metal surface comprising
(1) dipping said metal surface in aqueous solution of (a) 100 parts by weight of a 5% by weight aqueous solution of polyvinyl methylether-maleic acid copolymer, (b) 2 parts by weight of aluminum bichromate, (c) 1 part by weight of zinc phosphate, and (d) 500 parts by weight of water,
(2) electrolytically treating said metal surface by electrolysis of said aqueous solution, said electrolysis being conducted for 0.2 second at about 80° C. with current density of about 0.5 ampere per dm.$^2$, said metal surface being the cathode in said electrolysis, and
(3) thermally drying the resultant coated surface to thereby form a strong adherent film on said metal surface.

10. A surface treating method for a metal article to produce a film thereon by applying thereto a water-soluble film forming material, which comprises:
(I) providing an aqueous solution, the solute of which consists essentially of
(a) a water-soluble organic high polymer selected from the group consisting of a partially hydrolyzed polyvinyl acetate; a polyvinyl alcohol-maleic acid copolymer; a polyethylene oxide; a polymethylol urea; a polymethylol melamine; a polymethylol phenol; a polyalkylvinylether-maleic acid copolymer; polymaleic acid-ethylene copolymer; a polymaleic acid-vinyl acetate copolymer; a polyacrylic acid, a polymethacrylic acid, a copolymer of polyacrylic acid and methacrylic acid; and (b) a water-soluble compound selected from the group consisting of chromium compounds of trivalent and hexavalent chromium in an amount of about 0.01% to 20% by weight based on the weight of said solution, (c) an acidifying agent selected from the group consisting of boric acid, phosphoric acid and acidic salts of said acids in an amount of about 0.01% to 20% by weight based on the weight of the solution, the said solution having a pH of from 0.5 to 7.0 and a viscosity of 1 to 1000 centipoises at a temperature of from 15 to 80° C., (II) introducing an article of a metal selected from the group consisting of iron, tin, zinc, aluminum and magnesium in said solution, (III) subjecting said article in said solution to electrolysis as a cathode.

(IV) withdrawing the article from said solution and heating the same to dry at a temperature of from 100° to 300° C.

11. Method for treating metal surface comprising
(1) dipping said metal surface in aqueous solution of
    (a) 400 parts by weight of a 3% by weight aqueous solution of polyethylene-maleic acid copolymer,
    (b) 200 parts by weight of a 5% by weight aqueous solution of partially hydrolyzed polyvinyl acetate,
    (c) 8 parts by weight of 35% phosphoric acid,
    (d) 15 parts by weight of sodium bichromate, and
    (e) 2 parts by weight of potassium permanganate,
(2) electrolytically treating said metal surface by electrolysis of said aqueous solution, said electrolysis being conducted for 5 seconds at about 30° C. with a current density of about 2.8 amperes per dm.$^2$, said metal surface being the cathode in said electrolysis, and
(3) thermally drying the resultant coated surface at a temperature of 180° C. for about 20 seconds to thereby form a strong adherent film on said metal surface.

12. Method for treating metal surface comprising
(1) dipping said metal surface in aqueous solution of
    (a) 100 parts by weight of a 5% by weight aqueous solution of polyethylene oxide, (b) 25 parts by weight of a 5% by weight aqueous solution of polyvinyl methylether-maleic acid copolymer, (c) 1 part by weight of 85% phosphoric acid, and (d) 2 parts by weight of chromic acid,
(2) electrolytically treating said metal surface by electrolysis of said aqueous solution, said electrolysis being conducted for 2 seconds at about 25° C. with a current density of about 3 amperes per dm.$^2$, said metal surface being the cathode in said electrolysis, and
(3) thermally drying the resultant coated surface at a temperature of about 200° C. for a period of about 20 seconds to thereby form a strong adherent film on said metal surface.

13. Method for treating sheet steel surface comprising
(1) dipping said sheet steel in aqueous solution of
    (a) 500 parts by weight of a 6% by weight aqueous solution of polyvinyl methylether-maleic acid copolymer, (b) 100 parts by weight of a 5% by weight aqueous solution of partially hydrolyzed polyvinyl acetate, (c) 4 parts by weight 85% phosphoric acid, and (d) 6 parts by weight chromic acid,
(2) electrolytically treating said sheet steel by electrolysis of said aqueous solution, said electrolysis being conducted for 5 seconds at about 30° C. with a current density of about 2.5 amperes per dm.$^2$, said sheet steel being the cathode in said electrolysis, and
(3) thermally drying the resultant coated surface at a temperature of about 150° C. for about 30 seconds to thereby form a strong adherent film on said sheet steel surface.

14. Method for treating metal surface comprising
(1) dipping said metal surface in aqueous solution of
    (a) 100 parts by weight of a 3% by weight aqueous solution of polyethylene-maleic acid copolymer, (b) 50 parts by weight of a 50% by weight aqueous solution of polymethylol urea methylether, (c) 20 parts by weight of chromic acid,
(2) electrolytically treating said metal surface by electrolysis of said aqueous solution, said electrolysis being conducted for 10 seconds at about 15° C. with a current density of about 1.5 amperes per dm.$^2$, said metal surface being the cathode in said electrolysis, and
(3) thermally drying the resultant coated surface at a temperature of about 180° C. for a period of about 3 minutes to thereby form a strong adherent film on said metal surface.

15. Method for treating sheet steel surface comprising
(1) dipping said sheet steel in aqueous solution of (a) 150 parts by weight of a 10% by weight aqueous solution of polyvinyl acetate-maleic acid copolymer, (b) 20 parts by weight of a 50% by weight aqueous solution of polymethylol melamine methylether, (c) 1 part by weight boric acid, and (d) 3 parts by weight chromic acid,
(2) electrolytically treating said sheet steel by electrolysis of said aqueous solution, said electrolysis being conducted for 2 seconds at about 20° C. with a current density of about 3.5 amperes per dm.$^2$, said sheet steel being the cathode in said electrolysis, and
(3) thermally drying the resultant coated surface at a temperature of about 160° C. for about 5 minutes to thereby form a strong adherent film on said sheet steel surface.

References Cited by the Examiner

UNITED STATES PATENTS

| | | | |
|---|---|---|---|
| 2,145,710 | 1/39 | Clark | 204—56 |
| 2,215,143 | 9/40 | Clayton | 204—38 |
| 2,530,366 | 11/50 | Gray | 204—181 |
| 2,798,040 | 7/57 | Pye et al. | 204—55 |
| 2,812,296 | 11/57 | Neish | 204—38 |
| 2,947,677 | 8/60 | Blickwedel | 204—181 |
| 3,053,702 | 9/62 | Schuster et al. | 148—6.2 |
| 3,097,118 | 7/63 | Leonard | 148—6.16 |
| 3,101,287 | 8/63 | Curtin | 148—6.16 |

OTHER REFERENCES

Graham: Electroplating Engineering Handbook, 1955, Reinhold Publisher, pages 347–376.

Organic Finishing, May 1956, pages 12–14.

WINSTON A. DOUGLAS, *Primary Examiner.*

JOHN R. SPECK, MURRAY TILLMAN, *Examiners.*